(12) United States Patent
Modrego Jimenez

(10) Patent No.: US 10,054,111 B2
(45) Date of Patent: Aug. 21, 2018

(54) METHOD AND DEVICE FOR BLADE REPLACEMENT IN WIND TURBINES

(71) Applicant: GAMESA INNOVATION & TECHNOLOGY, S. L., Sarriguren (Navarra) (ES)

(72) Inventor: Raul Modrego Jimenez, Sarriguren (ES)

(73) Assignee: GAMESA INNOVATION & TECHNOLOGY, S.L., Sarriguren (Navarra) (ES)

( * ) Notice: Subject to any disclaimer, the term of this patent is extended or adjusted under 35 U.S.C. 154(b) by 382 days.

(21) Appl. No.: 14/748,807

(22) Filed: Jun. 24, 2015

(65) Prior Publication Data

US 2016/0010622 A1 Jan. 14, 2016

(30) Foreign Application Priority Data

Jul. 7, 2014 (ES) .................................. 201400538

(51) Int. Cl.

| F03D 80/50 | (2016.01) |
|---|---|
| F03D 80/70 | (2016.01) |
| B66C 1/10 | (2006.01) |
| F03D 13/20 | (2016.01) |
| F03D 13/10 | (2016.01) |

(52) U.S. Cl.
CPC .............. *F03D 80/50* (2016.05); *B66C 1/108* (2013.01); *F03D 13/10* (2016.05); *F03D 13/20* (2016.05); *F03D 80/70* (2016.05); *Y02E 10/728* (2013.01)

(58) Field of Classification Search
CPC .......... F03D 13/10; F03D 80/50; F03D 13/20; B66C 1/108; Y02E 10/728
See application file for complete search history.

(56) References Cited

U.S. PATENT DOCUMENTS

| 7,785,073 | B2* | 8/2010 | Wobben | ................... | F03D 80/50 |
|---|---|---|---|---|---|
|  |  |  |  |  | 416/146 R |
| 8,083,212 | B2* | 12/2011 | Numajiri | ................. | B66C 1/108 |
|  |  |  |  |  | 254/278 |
| 8,118,552 | B2* | 2/2012 | Nies | ........................ | F03D 80/50 |
|  |  |  |  |  | 416/1 |
| 8,191,253 | B2* | 6/2012 | Vangsy | ................... | F03D 13/10 |
|  |  |  |  |  | 29/889.1 |
| 8,534,421 | B2* | 9/2013 | Teichert | .................... | E04G 3/30 |
|  |  |  |  |  | 182/128 |

(Continued)

FOREIGN PATENT DOCUMENTS

| WO | 2009/128708 A2 | 10/2009 |
|---|---|---|
| WO | 2011/095167 A2 | 8/2011 |

*Primary Examiner* — Jacob Cigna
(74) *Attorney, Agent, or Firm* — Ladas & Parry LLP

(57) ABSTRACT

Method and device for replacing a blade (13) in wind turbines that comprises two elements, one upper (1) and the other lower (2) that work together to raise and/or lower the blade (13) of a wind turbine. The device's upper element or "top" (1) comprises some elements (4) bolted to the bearing (3) of the wind turbine and some means of fastening (5) the blade (13), while the lower element or "ground" (2) is a structure that encompasses the wind turbine tower (8) and has at least two winches (2.5) and two deviation pulleys (2.4) to connect some cables (6) between the device elements, namely the "top" (1) and "ground" (2).

12 Claims, 6 Drawing Sheets

(56) References Cited

U.S. PATENT DOCUMENTS

| | | | | |
|---|---|---|---|---|
| 8,595,931 B2* | 12/2013 | Riddell | ............... | B66C 1/108 29/889.6 |
| 8,651,462 B2* | 2/2014 | Van Berlo | ............ | B66C 23/207 254/278 |
| 8,939,299 B2* | 1/2015 | Ahler | ............... | B66C 23/207 212/270 |
| 8,997,350 B2* | 4/2015 | Trede | ............... | F03D 1/001 212/179 |
| 9,027,243 B2* | 5/2015 | Neumann | ............ | F03D 1/001 29/407.1 |
| 9,115,693 B2* | 8/2015 | Fenger | ............... | F03D 1/003 |
| 9,446,446 B2* | 9/2016 | Gabeiras | ............ | B21K 3/04 |
| 9,476,403 B2* | 10/2016 | Smith | ............... | B66C 1/108 |
| 9,638,163 B2* | 5/2017 | Holloway | ............ | F03D 80/50 |
| 9,651,021 B2* | 5/2017 | Neumann | ............ | F03D 80/50 |
| 9,745,953 B2* | 8/2017 | Neumann | ............ | F03D 80/50 |
| 9,821,417 B2* | 11/2017 | Neumann | ............ | F03D 1/0658 |
| 2006/0175465 A1* | 8/2006 | Teichert | ............... | B66C 23/207 244/33 |
| 2006/0228220 A1* | 10/2006 | Wobben | ............... | F03D 80/50 416/244 R |
| 2007/0290426 A1* | 12/2007 | Trede | ............... | F03D 1/001 269/1 |
| 2010/0005656 A1* | 1/2010 | Vangsy | ............... | F03D 13/10 29/889.1 |
| 2010/0028152 A1* | 2/2010 | Numajiri | ............... | B66C 1/108 416/146 R |
| 2010/0139062 A1* | 6/2010 | Reed | ............... | F03D 13/10 29/23.51 |
| 2010/0253086 A1* | 10/2010 | Song | ............... | F03D 13/10 290/55 |
| 2010/0254813 A1* | 10/2010 | Dawson | ............... | B66C 23/207 416/146 R |
| 2012/0217089 A1* | 8/2012 | Fenger | ............... | F03D 1/003 182/2.1 |
| 2013/0318789 A1* | 12/2013 | Gabeiras | ............... | B21K 3/04 29/889.7 |
| 2014/0010658 A1* | 1/2014 | Nielsen | ............... | B66C 1/108 416/204 R |
| 2014/0109407 A1* | 4/2014 | Neumann | ............... | F03D 1/001 29/889.1 |
| 2016/0010622 A1* | 1/2016 | Modrego Jimenez | .. | F03D 13/20 29/889.1 |
| 2016/0040649 A1* | 2/2016 | Smith | ............... | B66C 1/108 415/121.3 |
| 2016/0146183 A1* | 5/2016 | Puls | ............... | F03D 1/003 29/889.1 |

* cited by examiner

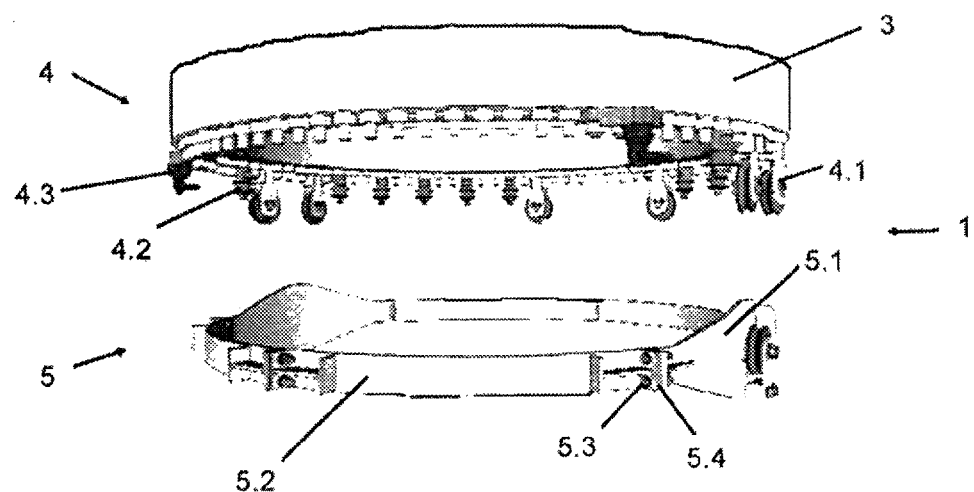
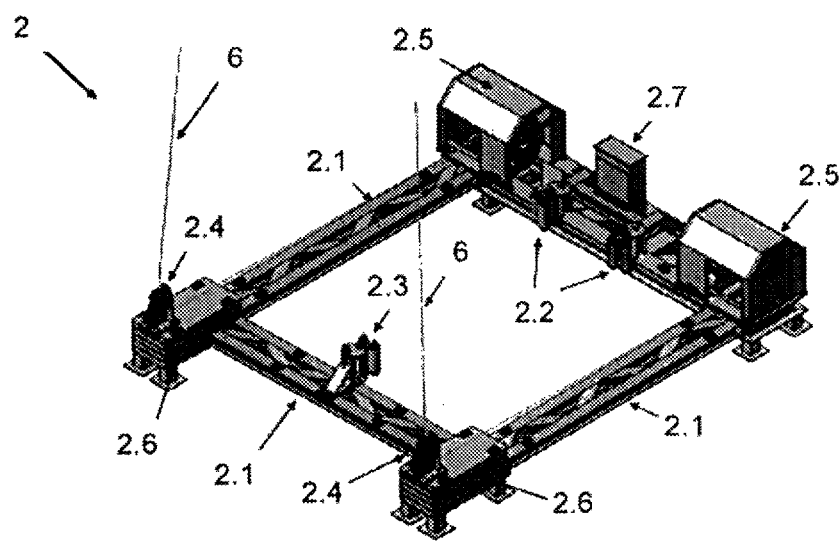
Figs. 1A and 1B
Fig. 2

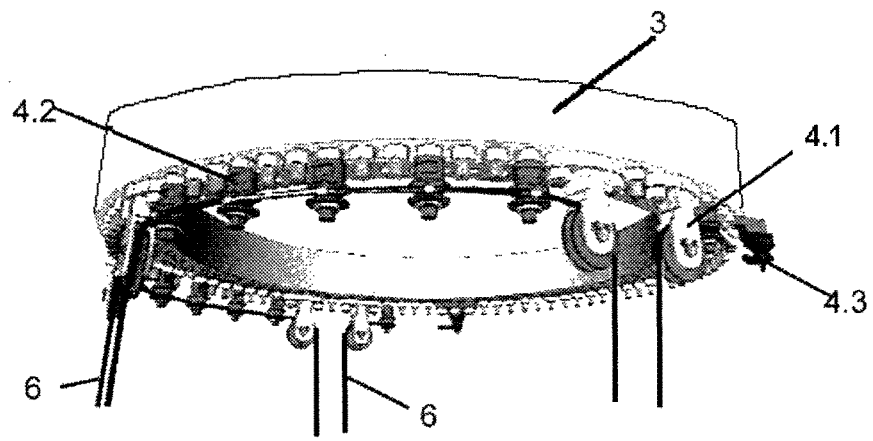
Fig. 3
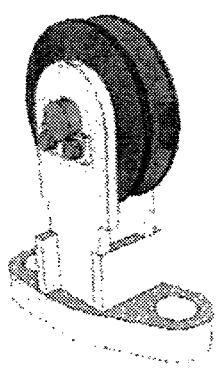 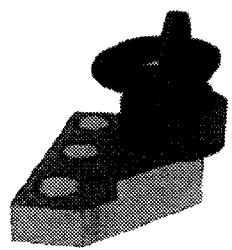 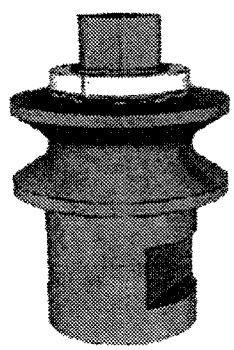
Fig. 4A      Fig. 4B      Fig. 4C

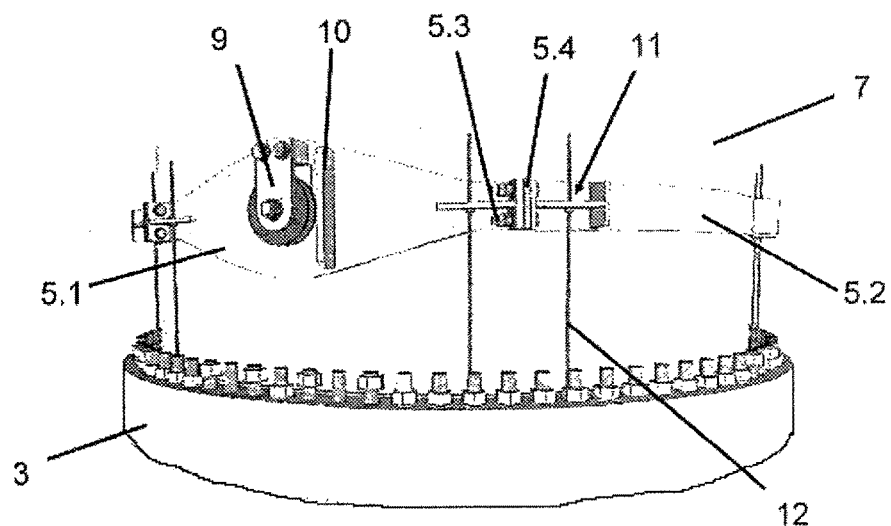
Fig. 5
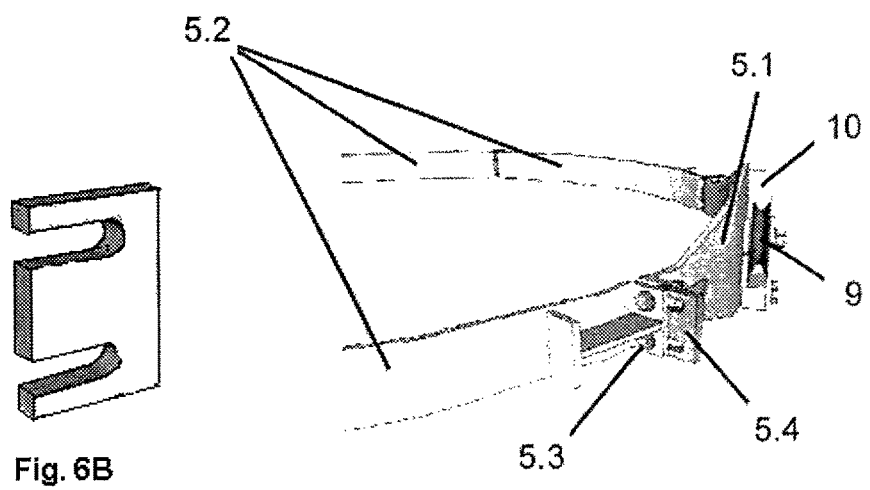
Fig. 6B
Fig. 6A

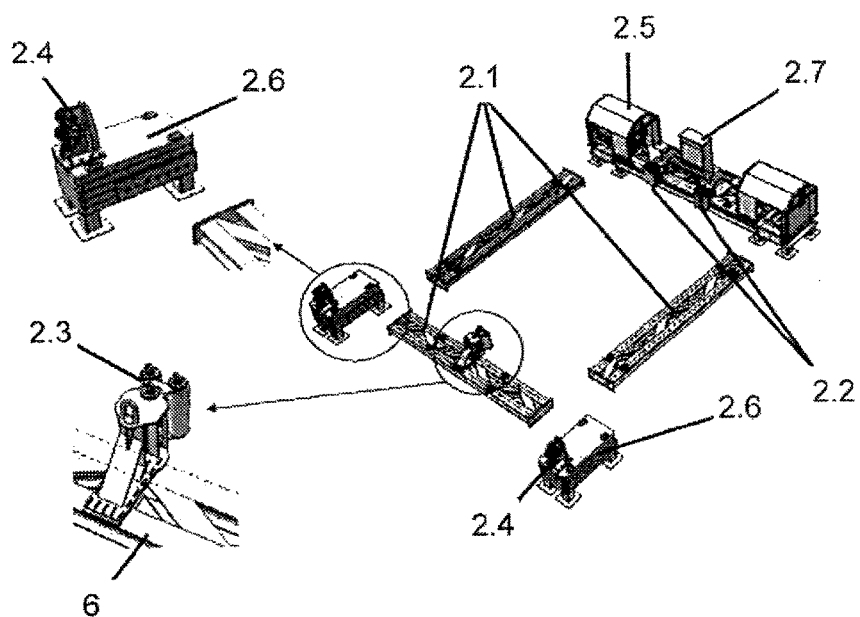
Figs. 7A, 7B, and 7C

METHOD AND DEVICE FOR BLADE REPLACEMENT IN WIND TURBINES

FIELD OF THE INVENTION

The present invention refers to a method and a device for mounting and dismounting blades onto wind turbines of the type that employ winches without a need for a conventional crane.

BACKGROUND OF THE INVENTION

The development of new wind turbines has resulted in an increase in their size and power. Large wind turbines enable more capacity to be installed at the same site and reduce the visual impact of a farm consisting of several wind turbines.

A wind turbine consists of a stationary tower that elevates a nacelle bearing an electrical generator attached to a rotor mechanically. The rotor comprises a hub that attaches at least one blade, bolted to some studs from some bearings on the hub, which transforms the wind's kinetic energy in the rotating rotor.

The increase of generated power is linked directly to the dimensions of the wind turbine rotor and the consequential lengthening of the wind turbine blades. The blades represent the most critical element of a wind turbine and therefore undergo preventive inspections and corrective interventions for which the blades must be dismounted from the hub and brought down to the ground, and subsequently hoisted and remounted onto the hub after completing the maintenance tasks.

To do so, maintenance workers use large-scale cranes for handling rotors of a significant size and weight. Cranes of this sort have various drawbacks. Firstly, they are very costly, hence the cost of installing a wind turbine farm or undertaking maintenance is notably increased with their use. Secondly, given that wind turbines are usually installed on sites that are not easily accessed, transferring these cranes to the required spot is virtually impossible and normally requires conditioned accesses, which adds further complications and costs.

In this regard, the acknowledged state of the art provides various solutions that describe different pieces of equipment for mounting and dismounting wind turbine blades.

Patent WO2011/095167 describes hoisting equipment for mounting/dismounting that has a winch inside the wind turbine hub and attaches the blade through a hook to plates bolted to the blade bearing joint bolts. The equipment has an element equipped with a roller that is placed between the hook and the winch, enabling the blade to be lowered vertically and subsequently rotated to a horizontal position when near the ground. However, the drawback of this system is its need for a large amount of space to install a winch that supports the elevated weights of current blades in addition to retention and rotation-proof systems that are more reliable than the one described above.

Patent WO2009/128708 describes equipment furnished with two elements, one placed on the wind turbine hub, which grasps the blade from the bearings, and the other placed inside the blade. These elements work together to raise or lower a blade using some means of positioning and some means of lifting. The blade, secured by a winch, is lowered vertically (the tip pointing toward the ground) by engaging an actuator in one of the means that balances the blade toward a predetermined alignment with the tower. A winch is used to guarantee the vertical descent of the blade Patent US2010/0253086 describes a system that incorporates some pulleys outside the hub, in the spaces existing between the blades, that are used for guiding a cable connected with a service crane located on the wind turbine nacelle or winch (W) installed on the ground. The blade is secured for lowering or raising by a pulley inside the hub.

In view of the drawbacks of the aforementioned solutions, a need is thus envisioned for implementing a solution that could guarantee the mounting and/or dismounting the blades at a minimum cost.

DESCRIPTION OF THE INVENTION

To do so, the replacement device of the invention comprises two elements, one upper and the other lower, which work together to raise and/or lower a wind turbine blade.

The upper element of the device, which will be referred to hereinafter as "top", consists of some pulley elements and some means for fastening the blade, while the lower element, which will be referred to hereinafter as "ground", consists of a structure that encompasses the wind turbine tower and is equipped with at least two winches and two deviation pulleys to connect cables between the device's "top" and "ground" elements.

One object of the invention is that the device can be used in any type of wind farm regardless of the type of installed wind turbines, thus the structure of the "ground" element of the device can be adjusted to fit different tower diameters.

One object of the invention is that the device can be used in any type of wind farm regardless of the type of installed wind turbines, thus the blade fastening element of the "top" element of the device can be adjusted to fit different blade diameters.

One object of the invention is that the device can be used at any wind farm site regardless of the climate conditions, thus the invention contemplates an inclinometer in the "ground" element that controls blade inclination during lowering and/or raising operations, as well as the load cells that measure the weight withstood by compression, and counterweights that counteract the blade's weight.

One object of the invention is that the system prevents the blade from turning over on itself or flipping, thus the device can be combined with any retention system and with any anti-rotation system.

One object of the invention is a method of raising and/or lowering a wind turbine blade using the device of the invention.

These and other aspects of the invention will be described in more detail with the help of the drawings shown below.

BRIEF DESCRIPTION OF THE DRAWINGS

FIGS. 1A and 1B depict the upper element of the replacement device of the invention.

FIG. 2 depicts the lower element of the replacement device according to one embodiment of the invention.

FIG. 3 is a perspective view of the layout of the bearing elements on the upper element of the replacement device according to one embodiment of the invention.

FIGS. 4A, 4B and 4C depict the different types of bearing elements on the upper element of the replacement device of the invention in the figure above.

FIG. 5 is a perspective view of the layout of the blade fastening means on the upper element of the replacement device according to one embodiment of the invention.

FIGS. 6A and 6B are detailed views of the blade fastening element of the figure above.

FIGS. 7A, 7B and 7C are some detailed views of the different elements constituting the lower element of the blade replacement device according to one embodiment of the invention.

DESCRIPTION OF A PREFERENTIAL EMBODIMENT

Figure 8:
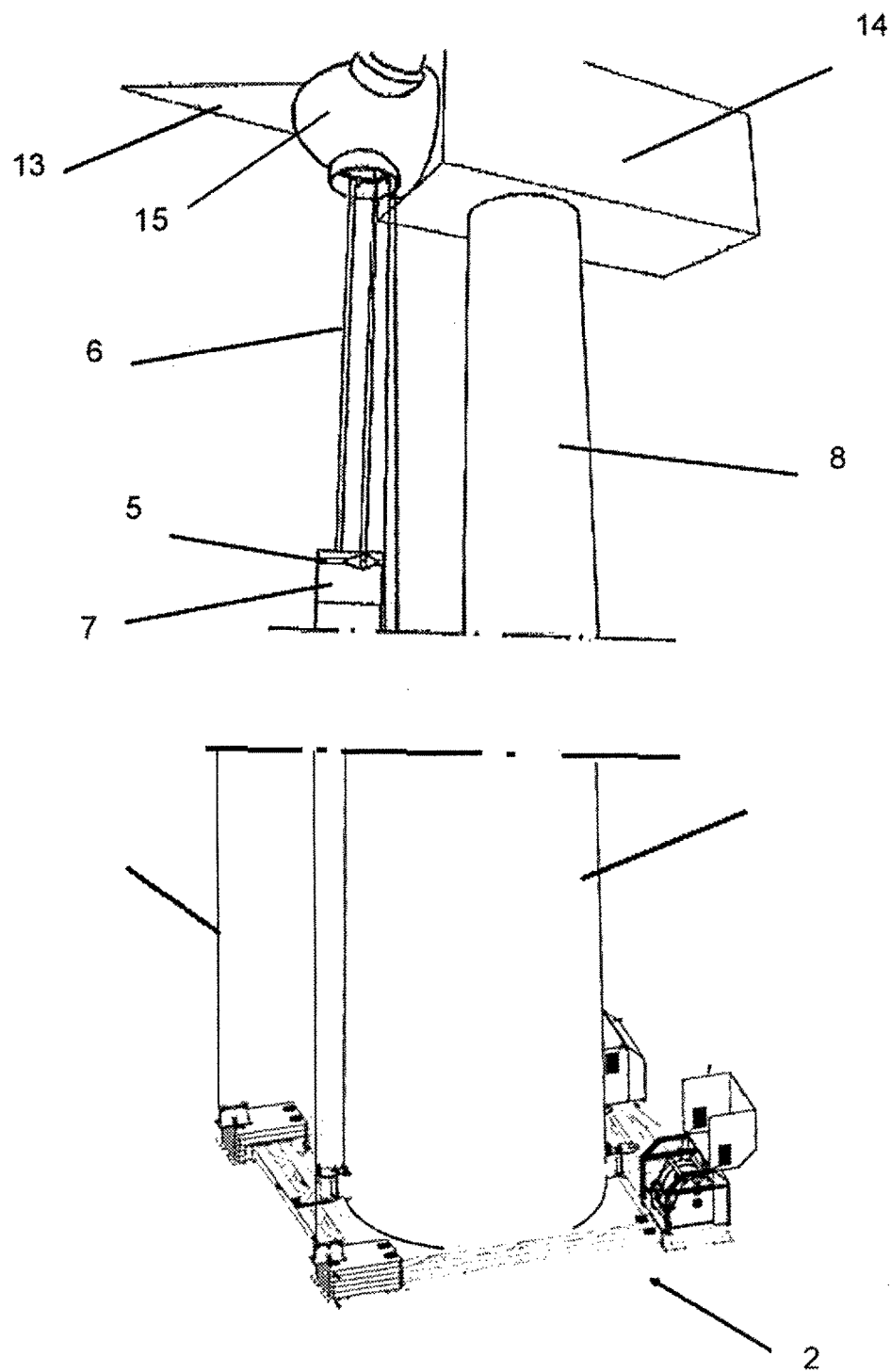
FIG. 8 is a perspective view of the replacement device applied onto a wind turbine.

The present invention is related with a method and a device for replacing the blades of a wind turbine in wind farm maintenance or installation tasks.

A wind turbine consists of a tower (8) that elevates a nacelle (14) bearing an electrical generator attached to a rotor mechanically.

The rotor comprises a hub (15) that attaches at least one blade (13) bolted to the wind turbine hub (15) through some bearings (3) equipped with some studs inserted into the blade root (7).

The device in the present invention for replacing a blade (13) consists of two elements (1, 2) that work together to ensure the correct lifting/lowering of the wind turbine blade (13), namely, a "top" element (1) (see FIGS. 1A and 1B) that is placed on the bearing (3) of the hub (15) and on the root (7) of the blade (13), and a "ground" element (2) (see FIG. 2) which remains available at the base of the tower (8) of the wind turbine.

The "top" element (1) comprises two parts (4, 5), one (4) that is attached to the bearing (3) of the hub (15) (FIG. 1A) and another (5) in the shape of a flange (FIG. 1B) that encompasses the root (7) of the blade (13).

The part (4) of the "top" element (1) that is secured on the bearing (3) of the blade (see FIG. 3) comprises various horizontal deviation pulleys (4.2) and vertical deviation pulleys (4.1), and various fastening elements (4.3) on the cable (6) (see FIGS. 4A, 4B and 4C), which are located on the outer track of the blade bearing (3) of the hub (15), which work by supporting, driving and securing the cables (6) that rise from the winches (2.5) on the "ground" element (2) and attach to the flange (5) for the blade (13) on the "top" element (1).

The vertical movement pulleys (4.1) are employed for moving the cable (6) toward the flange (5) for the blade (13) and the winches (2.5) of the "ground" element (2), while the horizontal deviation pulleys (4.2) are employed for guiding the cables (6) horizontally around the bearing (3) and the fastening elements (4.3) for fastening the final end of the cables (6).

The flange (5) for the blade (13) on the "top" element (1) (FIG. 1B) consists of two pulley segments (5.1) and at least two joint segments (5.2) bolted together by some bolts (5.3) for coupling that, in cooperation with some shims (5.4), enable adjustment of the diameter of the flange (5) to the diameter of the root (7) of the blade (13) (see FIGS. 6A and 6B). The pulley segments (5.1) comprise a pulley (9) and a reinforcement element (10), and the pulley (9) must be positioned facing the bearing (3) against the corresponding deviation pulley (4.1) on the bearing part (4) on the "top" element (1), while the joint segments (5.2) are symmetrical, thus there is no specific position in their placement. The flange (5) is created when joining the pulley segments (5.1) and the joint segments (5.2) so that there is a pulley segment (5.1) on each side of the blade (13), i.e., one on the side nearest the tower (8) and the other on the outer side.

In order for the blade flange (5) to work correctly, it must be level with the blade bearing (3). Given that the blade root (7) usually has quite a few irregularities, the segments (5.1, 5.2) of the blade flange (5) have a series of orifices (11) for inserting some rods (12) (see FIG. 5) that support with the end opposite to the segment (5.1, 5.2) on the blade bearing (3) and permit the adjustment of the flange (5) in terms of height with respect of the bearing (3). These rods (12) will subsequently be removed after flange (5) has been fully secured onto the root (7) of the blade (13).

According to one embodiment of the invention, the part (4) of the "top" element (1) that attaches to the bearing (3) and the part (5) that constitutes the flange of the blade (13) must be perfectly aligned with each other so that the deviation of the cable (6) between the vertical pulleys (4.1) and the pulleys (9) of the flange (5) are perfectly aligned, hence the different elements (4, 5) that constitute the "top" element must be in a correct position and the blade in position 0°.

The "ground" element (2) consists of a structure (2.1) formed by sections comprising some fixed rollers (2.2), a centering roller (2.3), some deviation pulleys (2.4), some winches (2.5), a dismountable structure (2.1), a counterweight (2.6), an electrical panel (2.7) and control elements such as an inclinometer (not represented) and some load cells (not represented) mounted on the return pulleys (2.4) of the counterweights (2.6) for controlling the tension in the cable (6).

The main section of the structure (2.1) supports the winches (2.5), electrical panel (2.7) and the fixed rollers (2.2), and is positioned at the head, at the base of the tower (8). The parallel sections of the structure (2.1) are symmetrical and bolted to the main section perpendicular to it. The counterweights (2.6) are placed on the ends of the parallel sections and a front section equipped with an adjustable centering roller (2.3) is placed between them. The front section, once placed onto the spot nearest the tower (8), is bolted between the counterweights (2.6) to finally adjust the adjustable centering roller (2.3) to the tower (8) (see FIGS. 7A, 7B and 7C).

The electrical panel (2.7) has a startup push-button and an emergency push-button (not represented), a touchscreen (not represented) to view the status of the various elements constituting the blade (13) replacement device in addition to indicators for the tension and movement of the cable (6) connected to the load cells of the pulleys (2.4) for the counterweights (2.6), a selector and some alarm pilot lights for the operation of the winches (2.5). The device is thus capable of configuring the working limits for the inclination of the blade (13) and the tension in the cables (6).

Figure 9:
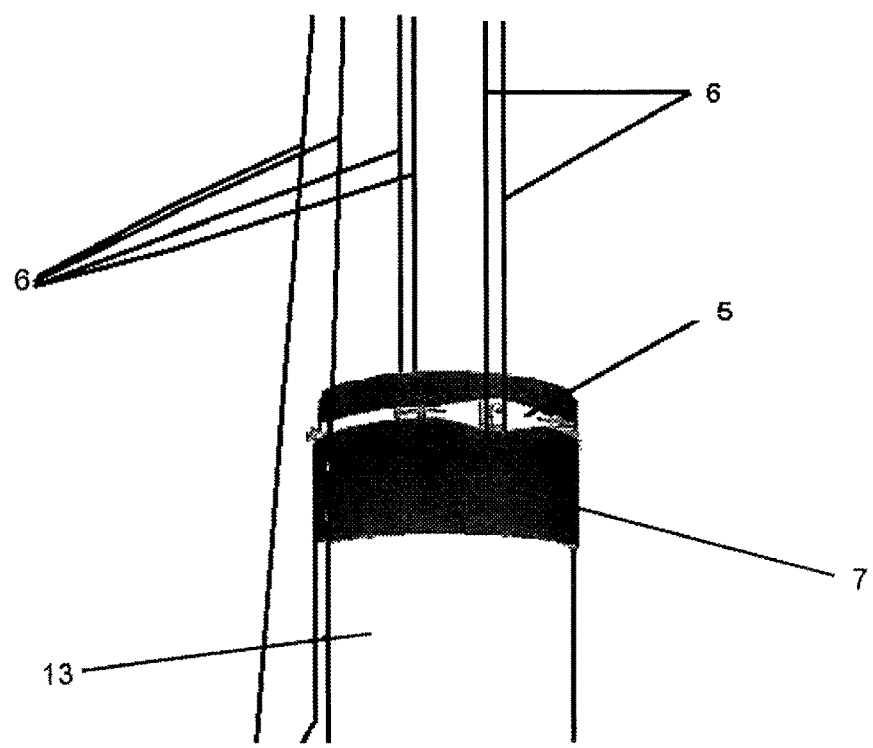
FIG. 9 is a detailed view of the blade fastening according to one embodiment of the invention.

The method for replacing the blade (see FIGS. 8 and 9) comprises the following steps:

Place the "ground" element (2) of the replacement device for the blade (13) at the tower base (8).

Mount the flange (5) of the "top" element (1) onto the root (7) of the blade (13) intended for replacement/repair.

Position the blade (13) vertical, pointing up, or horizontal.

Turn the wind turbine rotor until the blade (13) is in the horizontal position downward.

Hoist the cables (6) from the "ground" element (2) with an auxiliary crane (not represented) located on the wind turbine nacelle (14).

Run the cables (6) through the pulleys (9) at the pulley segments (5.1) of the flange (5) of the "top" element (1) on the root (7) of the blade (13) and through the horizontal deviation pulleys (4.2) and vertical deviation pulleys (4.1), and then secure them to the fastening elements (4.3) of the part (4) on the "top" element (1) fastened onto the blade bearing (3).

Detach the fastening of the auxiliary crane (not represented) located on the wind turbine nacelle (14).

Guide a retention tool (not represented) on the blade with a conventional retention system (not represented).

Unbolt the blade (13) from the bearing (3) of the wind turbine hub (15).

Lower the blade (13) by engaging the winches (2.5) at the "ground" element (2) of the replacement device for the blade (13), assisted by a conventional retention system (not represented), and then position it horizontally on the ground.

The hoisting of the blade (13) is done by following the blade lowering steps in the reverse order.

While this invention has been described entirely in connection with preferential embodiments, modifications may clearly be made within its scope, which is not restricted by the aforementioned embodiments, but rather by the content of the following claims.

The invention claimed is:

1. A wind turbine blade replacement device for use in maintenance or installation tasks at wind farms, the device comprising two elements (1, 2) that work together to ensure the correct elevation/descent of a wind turbine blade (13), namely a "top" element (1) positioned between a hub (15) and the wind turbine blade (13), and a "ground" element (2) positioned at a base of a wind turbine tower (8), wherein the "ground" element (2) consists of a structure (2.1) formed by sections comprising some fixed rollers (2.2), a centering roller (2.3), some deviation pulleys (2.4), some winches (2.5), a dismountable structure (2.1), a counterweight (2.6), an electrical panel (2.7) and control elements: an inclinometer and some load cells mounted on the deviation pulleys (2.4) of the counterweight (2.6) for controlling a tension in a cable (6).

2. The wind turbine blade replacement device according to claim 1, wherein a main section of the structure (2.1) supports the winches (2.5), the electrical panel (2.7) and the fixed rollers (2.2), and is positioned at the base of the tower (8).

3. The wind turbine blade replacement device according to claim 1, wherein parallel sections of the structure (2.1) are symmetrical and bolted to the main section perpendicularly.

4. The wind turbine blade replacement device according to claim 1, wherein counterweights (2.6) are placed on ends of the parallel sections and a front section equipped with an adjustable centering roller (2.3) is placed between the parallel sections.

5. The wind turbine blade replacement device according to claim 1, wherein the electrical panel (2.7) has a startup push-button and an emergency push-button, a touchscreen to view the status of the various elements constituting the blade (13) replacement device in addition to indicators for the tension and movement of the cable (6) connected to the load cells of the pulleys (2.4) for the counterweights (2.6), a selector and some alarm pilot lights for operation of the winches (2.5).

6. The wind turbine blade replacement device according to claim 1, the "top" element (1) comprising two parts (4, 5), a first part (4) fastened on a blade bearing (3) of the hub (15) and a second part (5) in a form of a flange that encompasses a root (7) of the blade (13).

7. The wind turbine blade replacement device according to claim 6, wherein the first part (4) of the "top" element (1) that is fastened on the blade bearing (3) has various horizontal deviation pulleys (4.2) and vertical deviation pulleys (4.1), and various fastening elements (4.3) for the cable (6), which are placed on an outer track of the bearing (3) of the blade on the hub (15) and whose function is to support, drive and fasten the cable (6) that rises from winches (2.5) at the "ground" element (2) and attached to the flange (5) for the blade (13) on the "top" element (1).

8. The wind turbine blade replacement device according to claim 6, wherein the flange (5) for the blade (13) on the "top" element (1) comprises two segments of pulley (5.1) and at least two joint segments (5.2), bolted together with some fastening bolts (5.3) that, in cooperation with some shims (5.4), enable a diameter of the flange (5) to be adjusted to a diameter of the root (7) of the blade (13).

9. The wind turbine blade replacement device according to claim 8, wherein the segments of the pulley (5.1) comprises a pulley (9) and a reinforcement element (10).

10. A wind turbine blade replacement device for using in maintenance or installation tasks at wind farms, the device comprising two elements (1, 2) that work together to guarantee the correct elevation/descent of the wind turbine blade (13), namely a "top" element (1) positioned between a hub (15) and the wind turbine blades (13), and a "ground" element (2) positioned at a base of a wind turbine tower (8), wherein the "ground" element (2) comprises a structure (2.1) formed by sections comprising some fixed rollers (2.2), a centering roller (2.3), some deviation pulleys (2.4), some winches (2.5), a dismountable structure (2.1), a counterweight (2.6), an electrical panel (2.7) and control elements: an inclinometer and some load cells mounted on the deviation pulleys (2.4) of the counterweights (2.6) for controlling the tension in a cable (6).

11. A method of replacing the wind turbine blade of the sort that uses a device according to claim 1, wherein the descent of the blade (13) entails the following steps:

placing the "ground" element (2) of the replacement device for the blade (13) at a tower base (8);

mounting a flange (5) of the "top" element (1) onto a root (7) of the blade (13) intended for replacement/repair;

positioning the blade (13) vertical, pointing up, or horizontal turning a wind turbine rotor until the blade (13) is in a horizontal position downward;

hoisting the cables (6) from the "ground" element (2) with an auxiliary crane (not represented) located on a wind turbine nacelle (14);

running the cables (6) through pulleys (9) at pulley segments (5.1) of the flange (5) of the "top" element (1) on a root (7) of the blade (13) and through a horizontal deviation pulleys (4.2) and vertical deviation pulleys (4.1), and then securing the cables (6) to fastening elements (4.3) of a first part (4) on the "top" element (1) fastened onto a blade bearing (3);

detaching a fastening of the auxiliary crane located on the wind turbine nacelle (14);

guiding a retention tool on the blade with a conventional retention system;

unbolting the blade (13) from the bearing (3) of a wind turbine hub (15); and lowering the blade (13) by engaging the winches (2.5) at the "ground" element (2) of the replacement device for the blade (13), assisted by a conventional retention system, and then positioning the blade (13) horizontally on the ground.

12. The method of replacing a wind turbine blade according to claim 11, wherein the hoisting of the blade (13) follows the steps for lowering the blade (13) in a reverse order.

\* \* \* \* \*